United States Patent
Crosby et al.

(10) Patent No.: US 7,761,010 B2
(45) Date of Patent: Jul. 20, 2010

(54) OPTICAL TRANSPONDER

(76) Inventors: Philip S. Crosby, 12401 SW. Terwilliger Blvd., Portland, OR (US) 97219; Alejandro E. Icaza, 6107 SW. Murray Blvd., #183, Beaverton, OR (US) 97008

( * ) Notice: Subject to any disclaimer, the term of this patent is extended or adjusted under 35 U.S.C. 154(b) by 25 days.

(21) Appl. No.: 12/177,681

(22) Filed: Jul. 22, 2008

(65) Prior Publication Data
US 2008/0298810 A1 Dec. 4, 2008

Related U.S. Application Data

(62) Division of application No. 10/307,104, filed on Nov. 27, 2002, now abandoned.

(51) Int. Cl.
*H04B 10/00* (2006.01)
(52) U.S. Cl. .................. 398/136; 398/135
(58) Field of Classification Search .......... 398/135, 398/136; 700/299
See application file for complete search history.

(56) References Cited

U.S. PATENT DOCUMENTS

| 5,345,455 | A | 9/1994 | Gabriagues et al. | |
|---|---|---|---|---|
| 5,557,437 | A | 9/1996 | Sakai et al. | |
| 5,604,757 | A | 2/1997 | Liang et al. | |
| 6,629,638 | B1* | 10/2003 | Sanchez | 235/454 |
| 2002/0149821 | A1* | 10/2002 | Aronson et al. | 359/152 |
| 2003/0020979 | A1 | 1/2003 | Bell | |
| 2003/0152118 | A1* | 8/2003 | Chieng et al. | 372/34 |
| 2003/0174454 | A1 | 9/2003 | Fu et al. | |
| 2005/0249468 | A1* | 11/2005 | Aronson et al. | 385/92 |

OTHER PUBLICATIONS

Converge Network Digest, www.convergedigest.com/Daily/v6/v6n218.htm, Nov. 11, 1999, 4 pgs.
Converge Network Digest, www.convergedigest.com/Daily/v8/v8n003.htm, Jan. 4, 2001, 2 pgs.
Optical Networks Daily,"3-year old, $100m funded, Network Elements intros 'smallest and lowest power 10 Gbit/s module'," www.opticalkeyhole.com/ondtextprint.asp?id=16846&pd=Aug. 20, 2001, Aug. 27, 2001, 1 pg.
Cravotta, Nicholas, "10-Gbps module goes small," www.edn.com/article/CA152882.html, Aug. 30, 2001, 2 pgs.
New Products, IEEE Communications Magazine, Oct. 2001, pp. 152-156.

(Continued)

*Primary Examiner*—Ryan A Jarrett
(74) *Attorney, Agent, or Firm*—Schwabe, Williamson & Wyatt, P.C.

(57) ABSTRACT

Methods and apparatus are provided in accordance with the present invention in which a control mechanism, such as for example, a microcontroller, provides an interface between an optical transponder and an external control system, such that monitoring and controlling of the optical components of the optical transponder are accomplished in an efficient and cost-effective manner. In some embodiments of the present invention, methods and apparatus provide for testing and calibration of the optical transponder without removing any portion of a protective housing within which the internal components of the optical transponder are disposed.

16 Claims, 7 Drawing Sheets

OTHER PUBLICATIONS

Network Elements—Our Products, http://web.archive.orb/web/20011211100737/www.networkelements.com/html/products/index.html, last accessed Jun. 10, 2006, 3 pgs.

Network Elements, Inc., "10 Gb/s MiniPHY Optical Networking Module," Fiber Optic Technology, www.fiberoptictechnology.net/scripts/SchowPR.asp?PUBCODE=025&ACCT=0004311&ISSUE=0107, last accessed Jun. 20, 2006, 2 pgs.

"Network Elements Ships First 10 Gb/s MiniPHY Optical Networking Module Meeting ITU Standards Over Full Temperature Range," Business Wire, Jul. 9, 2001.

Office Action mailed Feb. 25, 2008 for U.S. Appl. No. 10/307,104.
Office Action mailed Apr. 15, 2008 for U.S. Appl. No. 10/307,104.
Office Action mailed Sep. 10, 2008 for U.S. Appl. No. 10/307,104.
Office Action mailed Feb. 6, 2009 for U.S. Appl. No. 10/307,104.
Office Action mailed Jul. 24, 2008 for U.S. Appl. No. 11/513,752.
Office Action mailed Dec. 18, 2008 for U.S. Appl. No. 11/513,752.
Office Action, issued in U.S. Appl. No. 10/307,104, mailed Jan. 31, 2005.
Office Action, issued in U.S. Appl. No. 10/307,104, mailed Feb. 1, 2007.
Office Action, issued in U.S. Appl. No. 10/307,104, mailed Aug. 6, 2004.
Office Action, issued in U.S. Appl. No. 10/307,104, mailed Jan. 7, 2004.
Office Action, issued in U.S. Appl. No. 10/307,104, mailed Jun. 18, 2003.
Office Action, issued in U.S. Appl. No. 10/307,104, mailed Jul. 12, 2007.
Office Action, issued in U.S. Appl. No. 10/307,104, mailed Jul. 10, 2006.
Office Action, issued in U.S. Appl. No. 10/307,104, mailed Aug. 27, 2007.
Office Action, issued in U.S. Appl. No. 10/307,104, mailed Nov. 22, 2006.
Office Action, issued in U.S. Appl. No. 10/307,104, mailed Nov. 21, 2006.
Office Action, issued in U.S. Appl. No. 10/307,104, mailed Jun. 8, 2009.
Office Action, issued in U.S. Appl. No. 10/307,104, mailed Sep. 2, 2009.
Office Action, issued in U.S. Appl. No. 11/513,752, mailed Oct. 28, 2009.
Office Action, issued in U.S. Appl. No. 11/513,752, mailed Jun. 10, 2009.

Business Editors/Technology Writers, "Network Elements Offers Unparalleled Advantages in Size and Power with New 10 Gigabit 300-pin Optical Networking Module," Business Wire, Aug. 27, 2001, 2 pages.

Business/High-Tech Editors, "Network Elements Introduces VSR—600m—Optical Networking Module; Very-Short-Reach 10Gb/s Optical Networking Modules Now Available," Business Wire, Mar. 19, 2001, 2 pages.

Network Elements Inc., "10Gb/s MiniPHY-300 VSR 600m Module for DWDM, SONET, and 10GbE Applications," Network Elements Data Sheet, Jun. 5, 2009, 2 pages.

Network Elements Inc., "10Gb/s MiniPHY 200-pin Module for DWDM, SONET, and 10GbE Applications," Network Elements Data Sheet, Jun. 5, 2009, 2 pages.

"Harvard Mark I," Wikipedia reference, 4 pages.

"Harvard Architecture," Wikipedia reference, 3 pages.

Office Action, issued in U.S. Appl. No. 11/513,752, mailed Mar. 12, 2010.

Advisory Action, issued in U.S. Appl. No. 11/513,752, mailed May 19, 2010.

* cited by examiner

OPTICAL TRANSPONDER

BACKGROUND OF THE INVENTION

1. Field of the Invention

The present invention relates generally to computer-based industrial control systems, such as microprocessor control of analog and digital functionality, and more particularly relates to methods and apparatus for calibrating, monitoring, and controlling optical transponders.

2. Background Information

With advances in integrated circuit, microprocessor, networking and communication technologies, an increasing number of devices, in particular, digital computing devices, are being networked together. Such devices are often first coupled to a local area network, such as an Ethernet-based office/home network. In turn, the local area networks are interconnected together through wide area networks, such as Synchronous Optical Networks (SONET), Asynchronous Transfer Mode (ATM) networks, Frame Relays, and the like. Of particular importance is the TCP/IP based global inter-network, the Internet. The rapid growth of the Internet has fueled a convergence of data communication (datacom) and telecommunication (telecom) protocols and requirements. It is increasingly important that data traffic be carried efficiently across local, regional and wide area networks.

As a result of this trend of increased connectivity, an increasing number of applications that are network dependent are being deployed. Examples of these network dependent applications include, but are not limited to, the World Wide Web, email, Internet-based telephony, and various types of e-commerce and enterprise applications. The success of many content/service providers as well as commerce sites depends on high-speed delivery of a large volume of data across wide-areas. In turn, this trend leads to an increased demand for high-speed data trafficking equipment, such as high-speed optical-electrical routers or switches and the like. In other words, as a widening variety of new and traditional services converge across shared inter-networking transport structures, there is a critical need for the Internet to simultaneously deliver higher bandwidths, more reliable service, and greater deployment flexibility.

The widespread deployment of high-speed networking and communications equipment has produced a large demand for various types of networking and communications components and subsystems. Included among these are modules often referred to as optical transponders.

Optical transponders typically include components for both electrical signal processing, and components for transmission and reception of optical signals. Conventional optical transponders typically receive electrical signals in parallel, serialize the data represented by these signals, convert the serialized data into a light-based signal and couple that signal to an outbound optical fiber. Similarly, conventional optical transponders, typically receive a serialized light-based data stream, convert that data stream to an electrical equivalent, de-serialize that data, and provide the de-serialized electrical data, i.e., data in a parallel format, to a plurality of output terminals. Conventional optical transponders typically include a case, or housing, within which the electrical and optical components are housed. Such a case provides physical protection for the components, and also provides thermal conductivity so that heat may be dissipated from the components disposed within the case.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Figure 1:
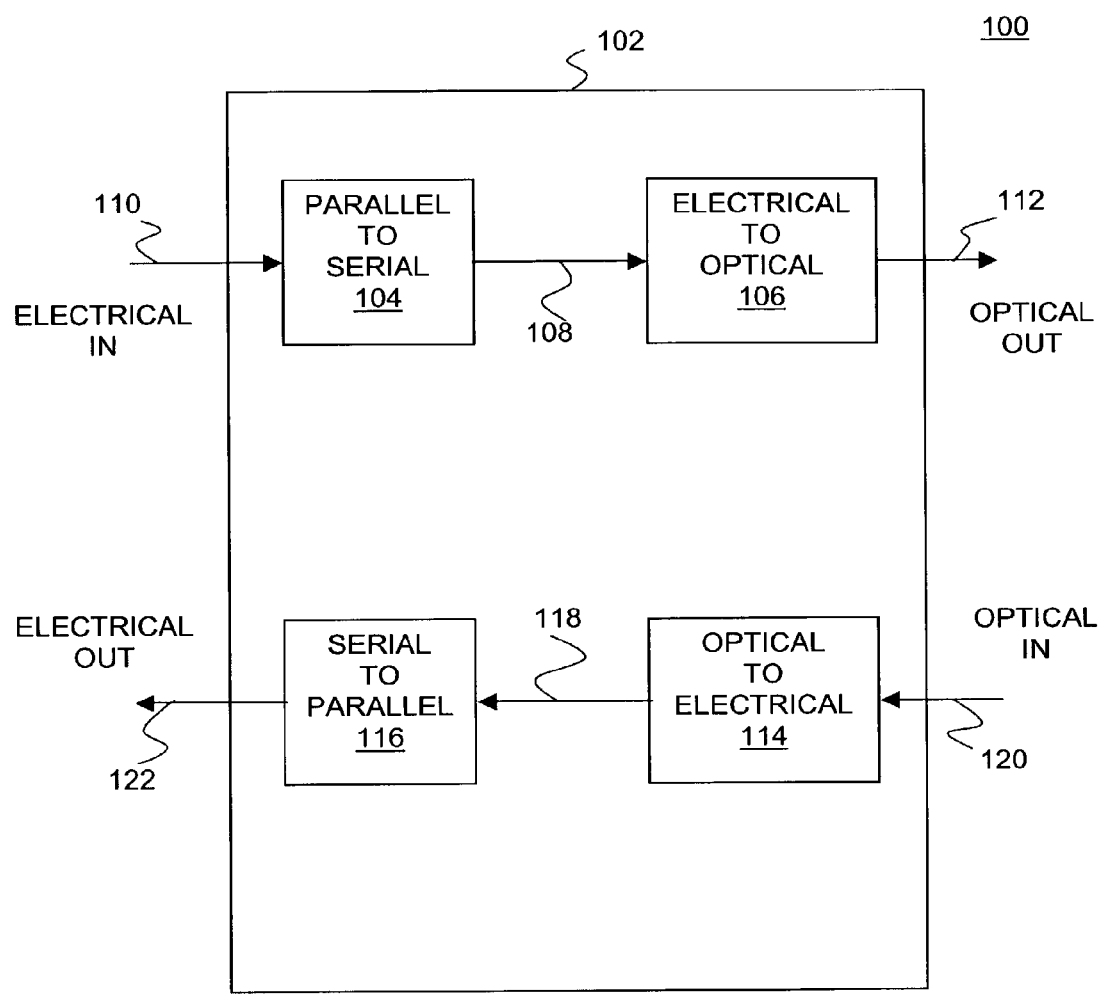
FIG. 1 is a high-level block diagram showing an optical transponder having a parallel-to-serial converter coupled to an electrical-to-optical converter, and an optical-to-electrical converter coupled to a serial-to-parallel converter, all housed in a physically protective and thermally conductive case, in accordance with the prior art.

Embodiments of the present invention calibrate, monitor, and control the components disposed within the case of an optical transponder module. For example, in one embodiment, a microcontroller inside an optical transponder provides an interface between the optical transponder and an external system to calibrate, monitor, and control the components of the optical transponder in an efficient and cost-effective manner. Some embodiments of the present invention calibrate, monitor, and control the optical transponder with a protective housing for the internal components of the optical transponder in place.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Reference herein to "one embodiment", "an embodiment", or similar formulations, means that a particular feature, structure, or characteristic described in connection with the embodiment, is included in at least one embodiment of the present invention. Thus, the appearances of such phrases or formulations herein are not necessarily all referring to the same embodiment. Furthermore, various particular features, structures, or characteristics may be combined in any suitable manner in one or more embodiments.

The term, microcontroller, generally refers to a class of integrated circuits, that includes, typically within a single chip, components such as, but not limited to, a central processing unit (CPU), a random access memory (RAM), a non-volatile memory, such as, but not limited to, a read only memory (ROM), that stores program code for execution by the CPU, a variety of input, output, input/output terminals (collectively referred to as ports), and may often include timer or counter circuits. Microcontrollers are sometimes referred to as embedded controllers, because they are part of an embedded system. Single-chip microcontrollers of a wide variety of architectures and specifications are commonly available from a broad range of manufacturers, and can be considered as a commodity item. As used herein, microcontroller refers to the definition above, as well as any other single-chip or multi-chip implementation of the logic required to provide the functionality described in connection with the various embodiments of the present invention.

The terms chip, integrated circuit, monolithic device, semiconductor device or component, and microelectronic device or component, are often used interchangeably in this field. The present invention is applicable to all of the above as they are generally understood in the field.

FIG. 1 is a high-level block diagram showing an optical transponder module 100 having a parallel-to-serial converter coupled to an electrical-to-optical converter, and an optical-to-electrical converter coupled to a serial-to-parallel converter, all housed in a physically protective and thermally conductive case, in accordance with the prior art. More particularly, a case 102 has disposed therein a parallel-to-serial converter 104, coupled to an electrical-to-optical converter 106, by way of a communications path 108. Communications path 108 is typically formed of an electrically conductive material disposed on an insulating substrate. Such an arrangement is typical of printed circuit boards. Parallel-to-serial converter 104 is adapted to receive electrical inputs at a plurality of input terminals which are coupled to electrical input communications path 110. Communications path 110 typically consists of a plurality of low-voltage swing differential signal line pairs. Electrical-to-optical converter 106 converts the serialized electrical data into modulated laser light which is then coupled onto optical output 112. Case 102 further has disposed therein, an optical-to-electrical converter 114, that is coupled to a serial-to-parallel converter 116. A communications path 118, typically consisting of electrically conductive material disposed on an insulating substrate, is used to transfer serial data, in electrical format, between optical-to-electrical converter 114, and serial-to-parallel converter 116. The output terminals of serial-to-parallel converter 116 are coupled to communications path 122. Communications path 122 typically consists of a plurality of low-voltage swing differential signal line pairs. Case 102 serves to provide both physical protection for the components of optical transponder module 100 and a thermally conductive pathway for removing waste heat from the various active components of optical transponder module 100.

Conventional optical transponders, such as the one illustrated in the high-level block diagram of FIG. 1, often employ control means such as jumpers, mechanical switches, and potentiometers to establish the digital and analog parameters necessary for the proper and correct functioning of those optical transponders, or similar modules. In order to conventionally make these adjustments, the optical transponder must have its outer case removed. Since this case serves to perform both a physically protective and a thermally dissipative function, these adjustments must be performed when the optical transponder is not in its intended configuration, thereby often leading to inaccurate calibration. Furthermore, reconfiguration of an optical transponder conventionally necessitates at least partial disassembly of the unit.

Conventional optical transponder interface standards, or specifications, require separate dedicated pins on the interface connector for the digital and analog control and monitoring functions. The functionality of such modules cannot easily be enhanced or modified unless general agreement within the industry can be established with respect to the function of the one or more connector pins that might be affected by a desired enhancement or modification. This inflexible architecture tends to increase the size, expense, and complexity of the interface connector and constitutes a significant barrier to innovations that could improve the functionality, reliability, and appropriateness for a particular purpose, of an optical transponder module.

Embodiments of the present invention provide methods and apparatus to achieve the monitoring and controlling of optical transponder modules and/or the components disposed within the case of an optical transponder module, including, in some embodiments, providing an interface to an external control module or other type of control system. In some embodiments, the functionality to support the above-mentioned monitoring and controlling is provided, at least in part, by computational resources such as, for example, microprocessors or microcontrollers that are included along with the other electronic component of the optical transponder module. Such microprocessors or microcontrollers are sometimes referred to as being embedded.

In some embodiments of the present invention, registered control bits are employed to perform the functions conventionally performed by means such as the jumpers and switches mentioned above. Such control bits may be incorporated within a microcontroller included within the optical transponder, or may be implemented with logic components outside of a microcontroller, but coupled thereto. The functionality of the conventional potentiometers, in some embodiments of the present invention, is performed by digital-to-analog converters (DACs). Further, in some embodiments, analog-to-digital converters (ADCs) are used variously to perform monitoring and closed-loop control functions.

In some embodiments, the control program and/or control parameters for a microcontroller in the optical transponder module can be electrically loaded using either an additional control interface, or through the aforementioned control interface, which may require using a multiplexer or other architecturally suitable means to separate the program code from the control and monitoring signals. It is noted that in some embodiments the control program and/or control parameters can be re-loaded, thereby providing for a repair, and/or modification process, in which corrected or updated program code can be provided to the program code memory of the microcontroller (which includes any other suitable stored program architecture device or devices, as that term is used herein). In such embodiments, any suitable type of non-volatile memory may be used, such as, but not limited to, flash memory, electrically erasable/programmable memory (EE-PROM), fuse or anti-fuse arrays, phase change material memories, battery-backed volatile memories, and so on. In still other embodiments, the control program for the microcontroller is stored in Read Only Memory (ROM) that is either integrated on a single chip with the microcontroller, or located external to the microcontroller but coupled thereto.

An architecture, in accordance with the present invention, provides for monitoring and controlling optical transponder modules without removing the physically protective and thermally conductive housing (i.e., case), which in turn allows for one or more of the manufacture, calibration, testing, maintenance, and operation of an optical transponder module in its complete form with the module case installed and the thermally conductive paths from the critical components in place. Since the optical transponder module is configured, calibrated, and monitored by signals communicated through the interface of the present invention, automated testing and calibration procedures, also in accordance with the present invention, are advantageously made available by such embodiments.

Figure 2:
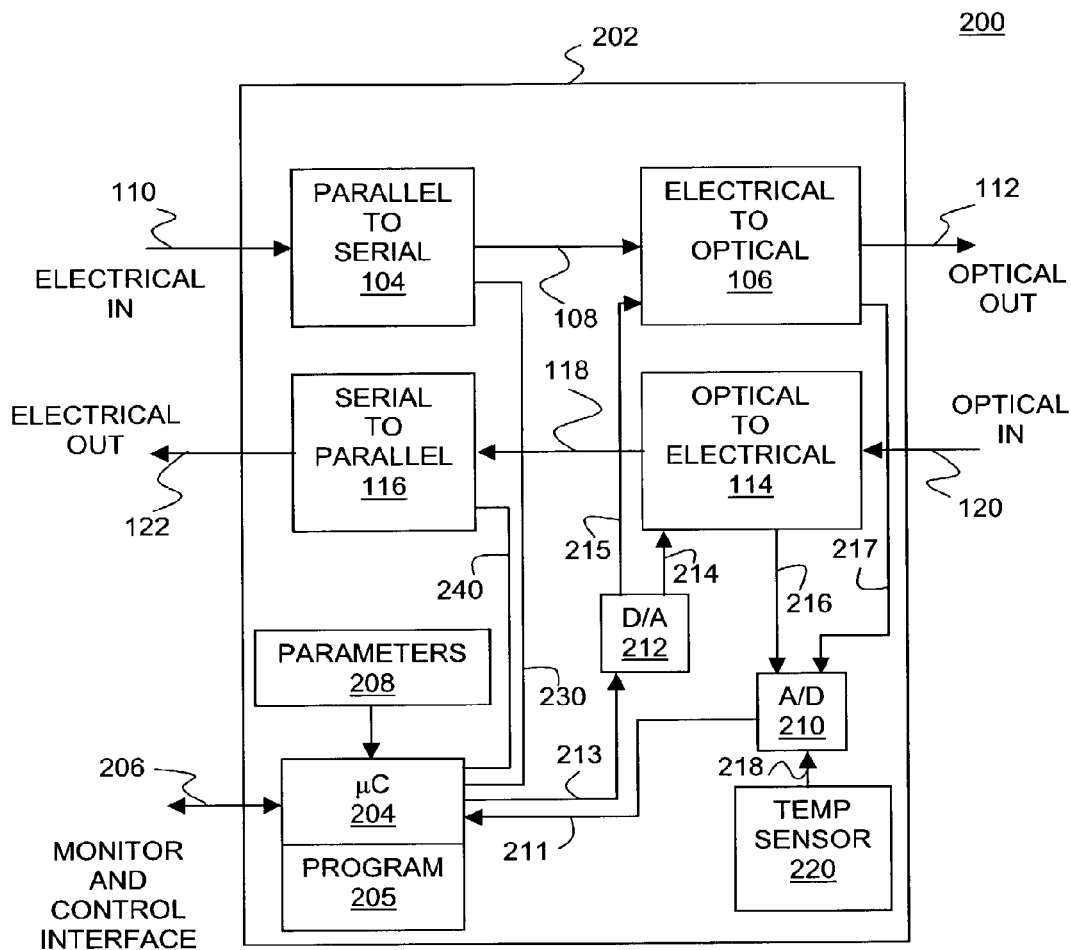
FIG. 2 is a block diagram showing an optical transponder having a parallel-to-serial converter coupled to an electrical-to-optical converter, an optical-to-electrical converter coupled to a serial-to-parallel converter, a microcontroller, having a program memory, coupled to a parameter memory, an analog-to-digital (A/D) converter, a digital-to-analog (D/A) converter, and a temperature sensor coupled to the A/D converter, all housed in a physically protective and thermally conductive case, in accordance with the present invention.

FIG. 2 is a block diagram showing an optical transponder module 200 having a parallel-to-serial converter coupled to an electrical-to-optical converter; an optical-to-electrical converter coupled to a serial-to-parallel converter; a microcontroller, having a program memory, coupled to a parameter memory; an analog-to-digital (A/D) converter coupled to the microcontroller; a digital-to-analog (D/A) converter coupled to the microcontroller; and a temperature sensor coupled to the A/D converter; all housed in a physically protective and thermally conductive case, in accordance with the present invention. More particularly, a case 202 has disposed therein a parallel-to-serial converter 104, coupled to an electrical-to-optical converter 106, by way of a communications path 108. Communications path 108 is typically formed of an electrically conductive material disposed on an insulating substrate. Parallel-to-serial converter 104 is adapted to receive electrical inputs at a plurality of input terminals which are coupled to electrical input communications path 110. Communications path 110 typically consists of a plurality of low-voltage swing differential signal line pairs. Electrical-to-optical converter 106 converts the serialized electrical data into modulated laser light which is then coupled onto optical output 112. Case 202 further has disposed therein, an optical-to-electrical converter 114, that is coupled to a serial-to-parallel converter 116. A communications path 118, typically consisting of electrically conductive material disposed on an insulating substrate, is used to transfer serial data, in electrical format, between optical-to-electrical converter 114, and serial-to-parallel converter 116. The output terminals of serial-to-parallel converter 116 are coupled to communications path 122. Communications path 122 typically consists of a plurality of low-voltage swing differential signal line pairs. Case 202 serves to provide both physical protection of the components of optical transponder module 200 and a thermally conductive pathway for removing waste heat from the various active components of optical transponder module 200. In this illustrative embodiment of the present invention, case 202 further has disposed therein, a microcontroller 204, and a program code memory 205 coupled to microcontroller 204. Microcontroller 204 may be any suitable device that provides the computational resources minimally required for any particular embodiment of the present invention. That is, embodiments in which more functionality is required by the designer, or in which more functionality per unit time is required, may use more powerful microcontrollers or other logic devices capable of providing the desired performance level. In this illustrative example, an eight-bit RISC-type microcontroller is used. In addition to providing the required computational resources, microcontroller 204 provides a plurality of terminals, which may be input terminals, output terminals, or bi-directional (i.e., I/O) terminals. In this field, such terminals of a microcontroller are often referred to as ports. Program code memory 205 may be integrated on the same chip on which microcontroller 204 is fabricated, or it may be a separate chip or chips. Program code memory 205 may be any suitable type of memory as noted in more detail above, however in the illustrative embodiment of FIG. 2, this memory is implemented as a programmable, non-volatile memory. By using a programmable, non-volatile memory as program code memory 205, embodiments of the present invention advantageously enable the updating or complete replacement of the stored instructions and/or data that control the operation of microcontroller 204, and thereby affect the operations of optical transponder module 200.

Still referring to FIG. 2, a connector 206 is built into case 202 and the terminals of connector 206 are electrically coupled to microcontroller 204. Connector 206 provides an input/output (I/O) pathway for communicating signals between microcontroller 204 and devices or systems external to optical transponder module 200. Other signal pathways, such as those of communication pathway 110 and communication pathway 122, may be bundled with connector 206, or in alternative embodiments may be made through a separate connector that is built into case 202. A parameter memory 208 is disposed within case 202 and coupled to microcontroller 204. Parameter memory 208 may be any suitable form of data storage device, but in the illustrative example of FIG. 2, it is implemented as a programmable, non-volatile memory such as flash memory or EEPROM. An A/D converter 210, having input terminals adapted to receive analog signals, and output terminals adapted to provide digital signals, is disposed within case 202. The digital output terminals of A/D converter 210 are coupled respectively to input terminals of microcontroller 204 by electrical pathway 211. In the illustrative embodiment of FIG. 2, A/D converter 210 is coupled by electrical pathways 216, 217, an 218, respectively to optical-to-electrical converter 114, electrical-to-optical converter 106, and temperature sensor 220. Temperature sensor 220 may be implemented with any suitable component or components, such as for example, a thermistor configured to develop a voltage or current signal that is representative of the temperature in the region of optical transponder 200 in which the thermistor is located. In some embodiments, the A/D functionality is incorporated within a microcontroller.

By converting one or more analog signals representative of various operational characteristics of optical transponder module 200 to digital format, microcontroller 204, or any other digital logic network may easily process the information, make decisions affecting performance, communicate status information to devices external to optical transponder module 200, store the status information for later review or retrieval, or any such combination of activities. By way of example and not limitation, a voltage representative of the temperature where temperature sensor 220 is located is coupled to A/D converter 210 which in turn provides a digital value corresponding to the temperature to microcontroller 204. Microcontroller 204 can then make a determination, by execution of stored instructions from program memory 205, as to whether any action is required in view of the value of the digitized temperature data.

Still referring to FIG. 2, a D/A converter 212, having input terminals adapted to receive digital signals, and output terminals adapted to provide analog signals, is disposed within case 202. The digital input terminals of A/D converter 212 are coupled respectively to output terminals of microcontroller 204 by electrical pathway 213. In alternative embodiments, the D/A functionality is integrated within a microcontroller. At least a first analog output terminal of D/A converter 212 is coupled to optical-to-electrical converter 114 by electrical pathway 214, and at least a second analog output terminal of D/A converter 212 is coupled to electrical-to-optical converter 106 by electrical pathway 215. By converting one or more digital values to analog signals, various circuit control functions may be implemented. By way of example and not limitation, control functions can be implemented for controlling optical power output levels of electrical-to-optical converter 114.

It is noted, with respect to the illustrative embodiment of FIG. 2, that circuits for implementing the functionality of D/A and A/D conversion may be integrated onto a single chip with a microcontroller, and that such modifications are within the scope of the present invention.

Not all signals require D/A or A/D conversion. For instance, in FIG. 2, electrical pathways 230 and 240 carried entirely digital control signals between microcontroller 204 and parallel-to-serial converter 104 and serial-to-parallel converter 116, respectively.

FIGS. 3-7 are flow charts illustrating various embodiments of the present invention, including methods of controlling the operation of optical transponders, monitoring the operating conditions of optical transponders and recording information regarding those conditions, monitoring the operating conditions of optical transponders and reporting on those conditions, monitoring and controlling the operations of optical transponders, and calibrating optical transponders.

Figure 3:
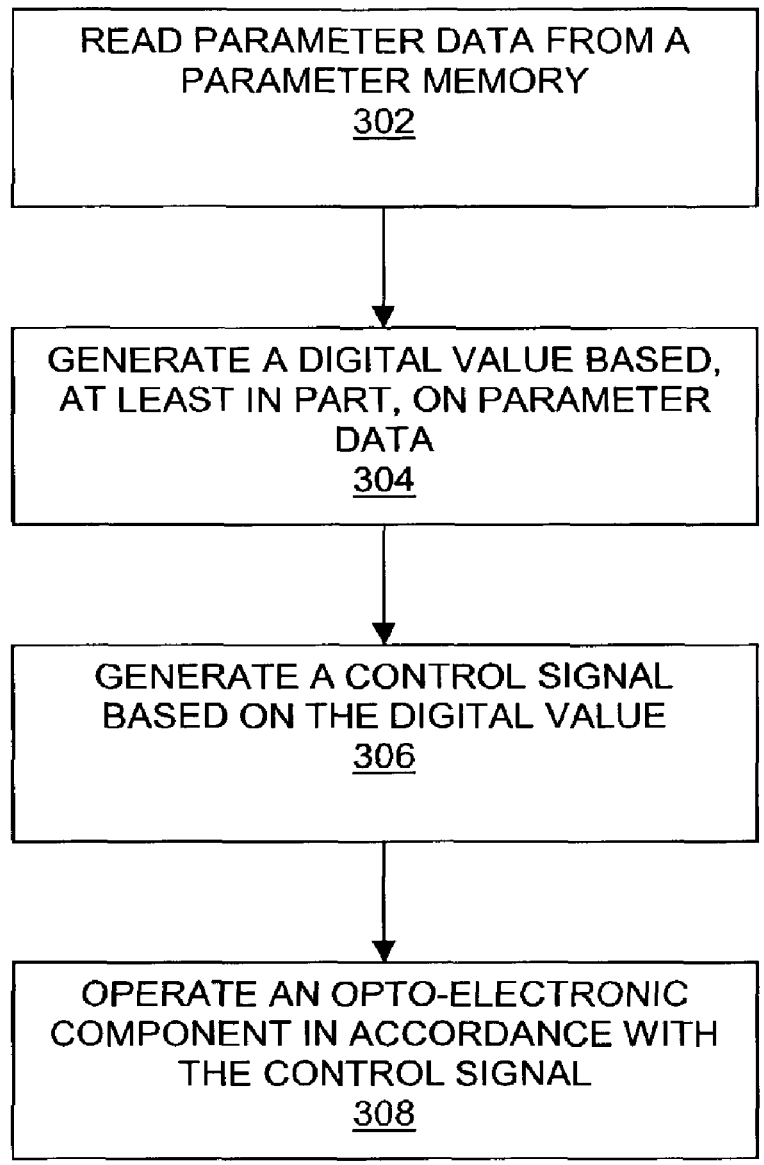
FIG. 3 is a flow chart illustrating a method of controlling the operation of at least one opto-electronic component disposed in an optical transponder module in accordance with the present invention.

FIG. 3 is a flow chart illustrating a method of controlling the operation of at least one opto-electronic component disposed in an optical transponder module in accordance with the present invention. More particularly, parameter data is read from a memory 302. This memory may be referred to as a parameter memory because of the nature of the data stored therein, but it is noted that the physical characteristics of the memory are not determined by the content of the data stored therein. The electrical characteristics of the parameter memory are described above in connection with FIG. 2. The parameter information is typically read from the parameter memory by a microcontroller. At least one digital value is then generated, based at least in part on the parameter data 304. Typically the microcontroller generates the digital value(s). The digital value(s) may be the same data that was read from the parameter memory, or it may be a function or functions of the parameter data. In the case where the at least one digital value is a function of the parameter data, it will be understood that the microcontroller may make adjustments based on its knowledge of the present operational status of the optical transponder module, such as for example, the temperature at a particular location within the optical transponder module.

Still referring to FIG. 3, a control signal is generated based, at least in part, on at least one digital value that was previously generated 306. The control signal may be digital or analog. Generating an analog control signal is typically accomplished by providing at least one digital value to the digital input terminals of an D/A converter, which in turn performs the conversion function and provides at its analog output terminals an analog signal. An opto-electronic component within the optical transponder module is then operated in accordance with the control signal, be it digital or analog 308. By way of example and not limitation, a bias circuit that provides part of the control network that operates a laser diode in an electrical-to-optical component, receives an analog control signal from the D/A converter such that the output characteristics of the laser diode are a function of that analog control signal.

Figure 4:
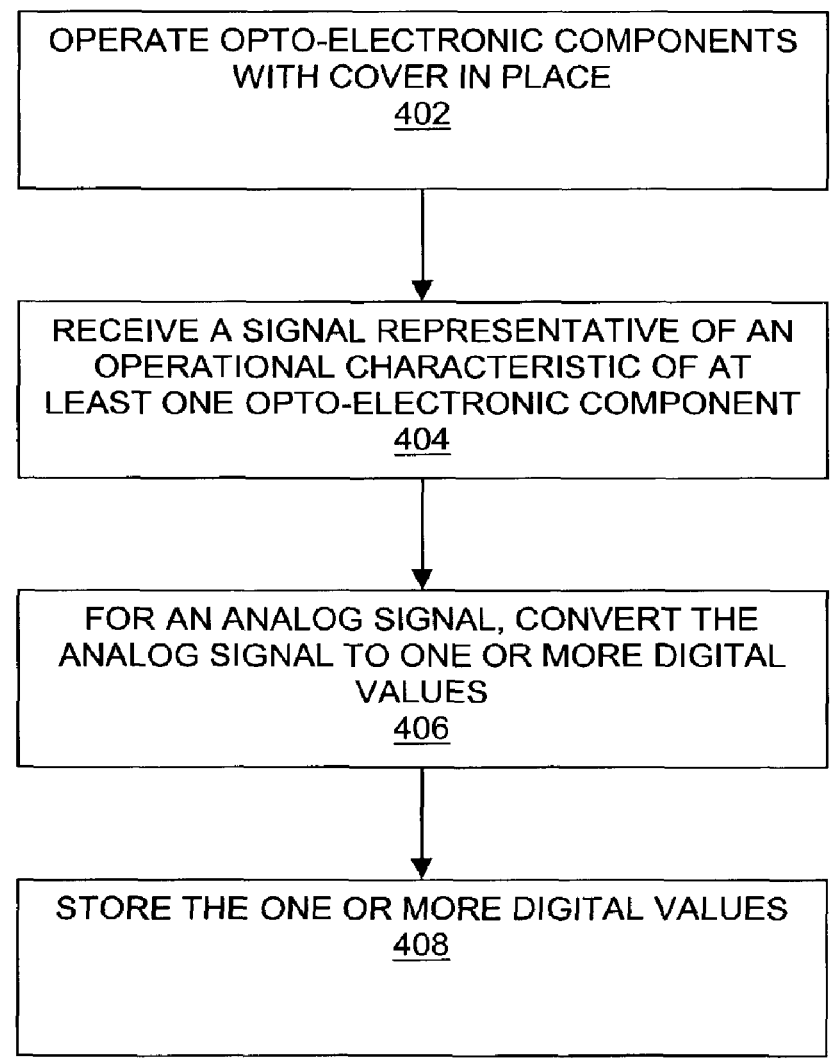
FIG. 4 is a flow chart illustrating a method of monitoring the operation of at least one opto-electronic component disposed in an optical transponder module, and recording information based the monitored operation in accordance with the present invention.

FIG. 4 is a flow chart illustrating a method of monitoring the operation of at least one opto-electronic component disposed in an optical transponder module, and recording information based on the monitored operation in accordance with the present invention. The process described in connection with FIG. 4 may be referred to as taking a snapshot of the operational status of the optical transponder. More particularly, one or more of the opto-electronic components of the optical transponder module are operated with the physically protective and thermally dissipative cover in place 402. A signal, representative of an operational characteristic of at least one of the opto-electronic components is received 404. The signal may be analog or digital. For an analog signal, the signal is typically converted using an A/D converter to a digital format that may include one or more digital values 406. The digital values, which are representative of the operational characteristics are stored in a memory that is disposed within the optical transponder module 408. These values can subsequently be read out and communicated to external devices. It is noted that, in accordance with various embodiments of the present invention, additional information may be stored in the memory along with digital values derived from the analog signals. For example, the optical module may include a clock, or other time and/or date circuit, which can be read for the purpose of time-stamping the snapshot data.

Figure 5:
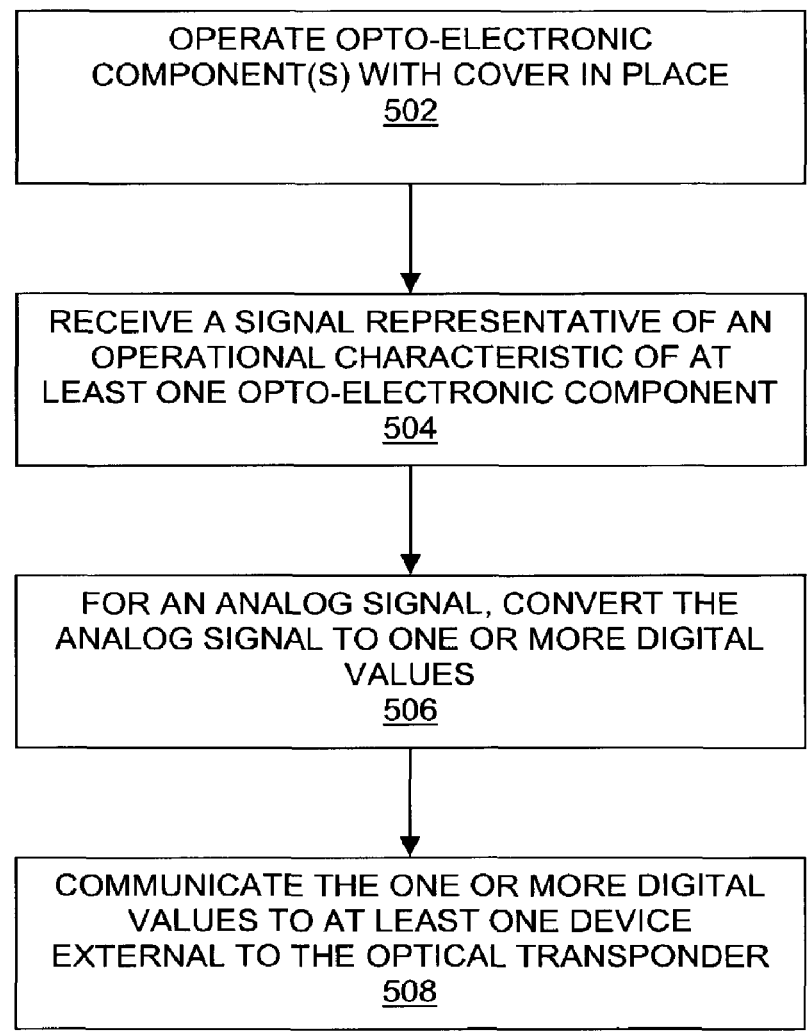
FIG. 5 is a flow chart illustrating a method of monitoring the operation of at least one opto-electronic component disposed in an optical transponder module, and reporting information to a device external to the optical transponder based on the monitored operation in accordance with the present invention.

FIG. 5 is a flow chart illustrating a method of monitoring the operation of at least one opto-electronic component disposed in an optical transponder module, and reporting information to a device external to the optical transponder based on the monitored operation in accordance with the present invention. More particularly, one or more of the opto-electronic components of the optical transponder module are operated with the physically protective and thermally dissipative cover in place 502. A signal, representative of an operational characteristic of at least one of the opto-electronic components, is received 504. The signal may be analog or digital. For an analog signal, the signal is typically converted using an A/D converter to a digital format that may include one or more digital values 506. The digital values, which are representative of the operational characteristics, are communicated to at least one device which is external to the optical transponder module 508. Operational characteristics include, but are not limited to, receive power, transmit power, and temperature. Those skilled in the art and having the benefit of this disclosure will recognize that other components, parameters, or operational characteristics of an optical transponder may also be monitored consistent with the present invention.

Still referring to FIG. 5, communication 508 of the digital values described above, is typically achieved by means of a wired connection between the optical transponder module and the at least one external device, however the present invention is not limited to wired communication. For example, in some embodiments a radio-frequency (RF), or an infra-red (IR) link may be used in place of a wired connection to communicate information between the optical transponder module and external devices or systems. In embodiments that use a wired connection between the optical transponder and an external device, any suitable architecture or design may be used. For example, architectures and physical connections such as but not limited to, a serial bus or a parallel bus may be used; single-ended or differential signaling may be used, twisted-pair or coaxial wiring may be used, synchronous or asynchronous signaling may be used, and so on. Those skilled in the art and having the benefit of the present disclosure will recognize that many wired interconnection schemes are available for implementing the communication pathway of the present invention.

It is noted that testing of an optical transponder may comprise the monitoring and reporting described above in connection with FIG. 5.

Figure 6:
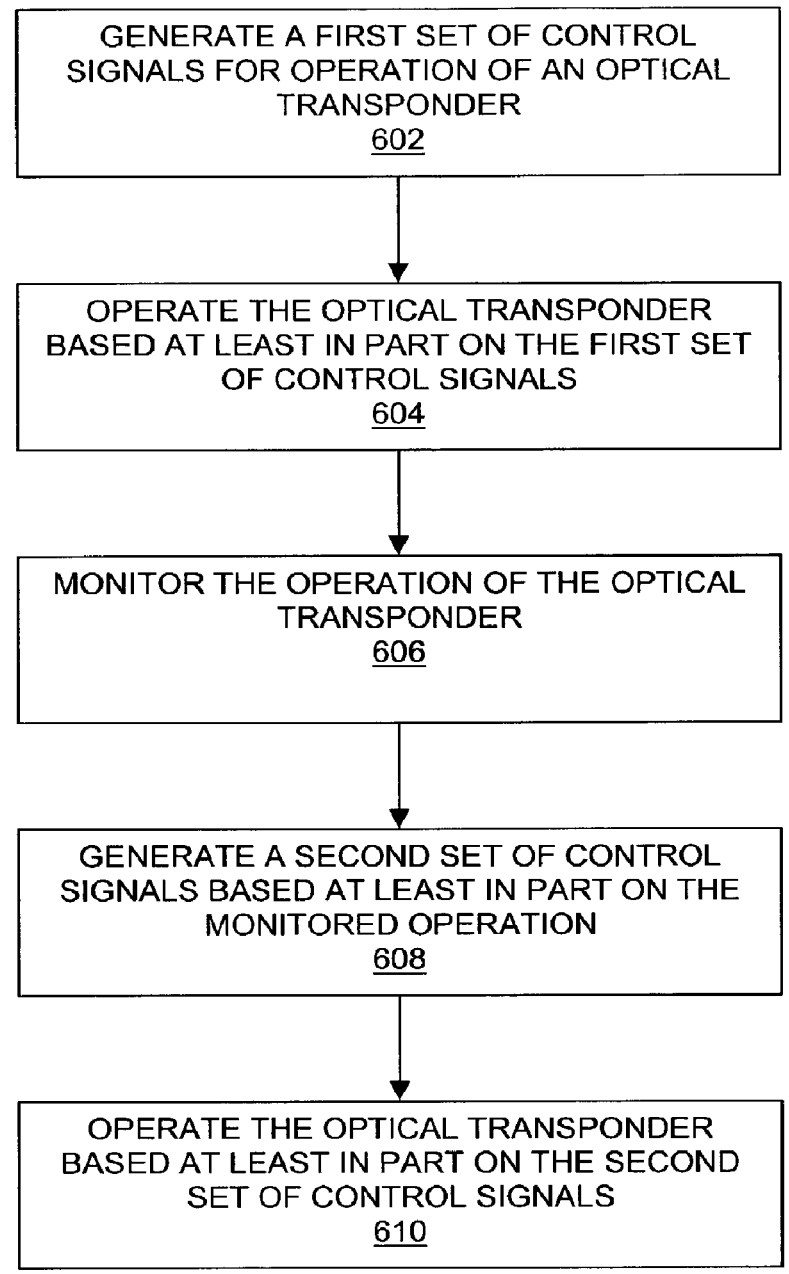
FIG. 6 is a flow chart illustrating a method of monitoring and controlling the operation of at least one opto-electronic component disposed in an optical transponder module in accordance with the present invention.

FIG. 6 is a flow chart illustrating a method of monitoring and controlling the operation of at least one opto-electronic component disposed in an optical transponder module in accordance with the present invention. More particularly, a first set of control signals for operation of an optical transponder are generated 602. In the illustrative embodiment of FIG. 2, some of the control signals are generated by the microcontroller providing digital values to at least one D/A converter, and the D/A converter(s) providing, in turn, analog control signals to an opto-electronic component such as an optical (e.g., laser) transmitter circuit, or an optical (e.g., photodiode) receiver circuit. The optical transponder, including the opto-electronic components thereof, is operated, based at least in part, on the first set of control signals 604. The operation of the optical transponder is monitored 606. In the embodiment of FIG. 2, monitoring certain components of the optical transponder includes converting an analog voltage at one or more nodes to digital values and providing those digital values to a microcontroller disposed within the case of the optical transponder. The microcontroller, under control of its stored program instructions, then evaluates the operation of the optical transponder by, among other things, comparing laser transmit power, receive current, module temperature, and so on, to expected operating values. Based at least in part on the monitored operations, a second set of control signals is generated 608. In the embodiment of FIG. 2, generating some control signals in the second set is accomplished by the microcontroller providing one or more digital values to one or more D/A converters (or alternatively to one or more D/A channels of a D/A converter). The corresponding analog output signals produced by the D/A converters being coupled to the various components produce changes in the operational characteristics of those components. In other words, the optical transponder is operated, based at least in part, on the second set of control signals 610. By way of example and not limitation, the microcontroller may determine that the temperature of the optical transponder is such that the bias voltage applied to a laser transmitter should be increased, and therefore change the digital value applied to the D/A channel that drives the bias input node of the laser transmitter. In this way, the optical transponder is operated and monitored, and changes are automatically made in various control signals to compensate for drifting operational characteristics, or for any other suitable reason.

Figure 7:
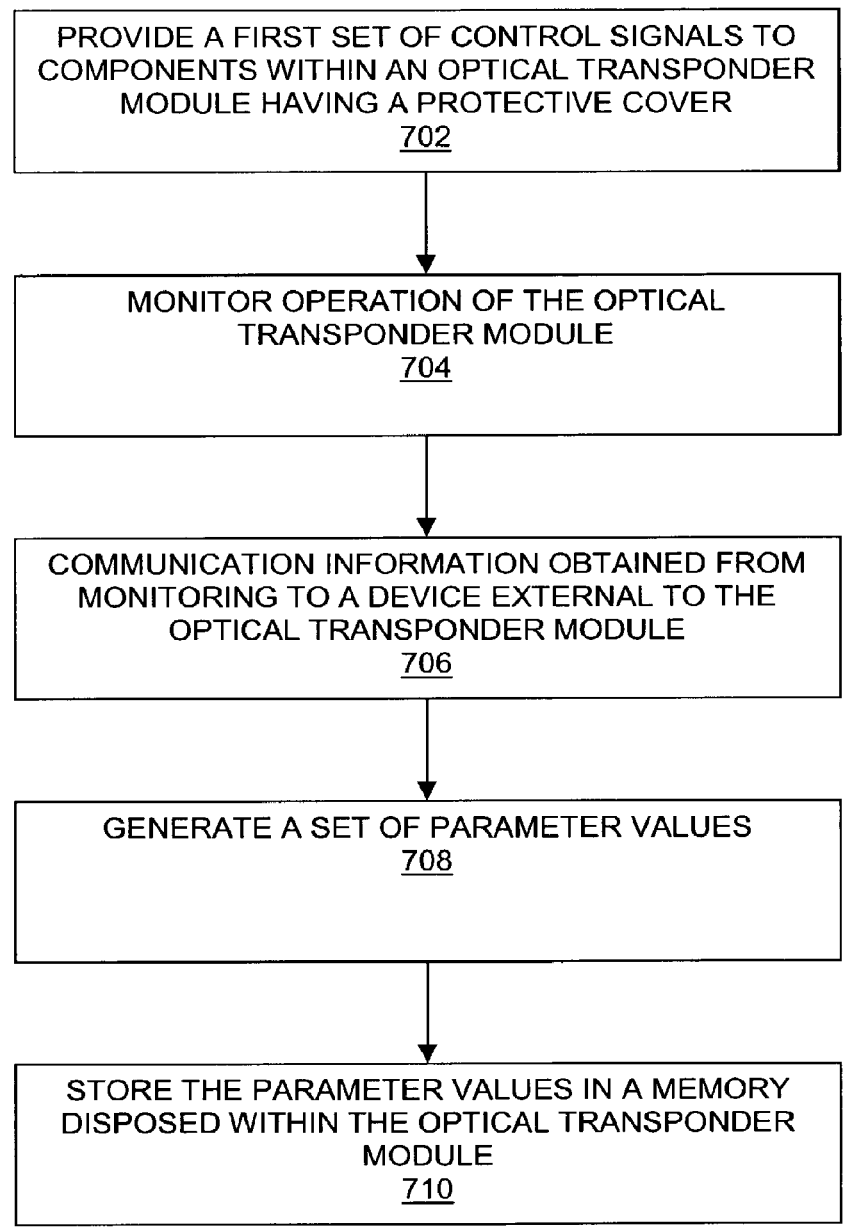
FIG. 7 is a flow chart illustrating a method of calibrating the operation of at least one opto-electronic component disposed in an optical transponder module in accordance with the present invention.

FIG. 7 is a flow chart illustrating a method of calibrating the operation of at least one opto-electronic component disposed in an optical transponder module in accordance with the present invention. In some embodiments of the present invention, a microcontroller and D/A converters within the optical transponder provide control signals that are generated, based at least in part, on a stored control program executed by the microcontroller. However, when a number of optical transponders are manufactured, there may be differences in the performance of each of them due to the variances in the characteristics of individual components of the optical transponder. FIG. 7 illustrates a calibration process in which the optical transponder, having its physically protective and thermally dissipative cover in place, is operated, measurements made, and calibration parameters developed and stored in a memory within the optical transponder. The calibration parameters are used by the stored control program executed by the microcontroller to fine tune the control signals to compensate for various manufacturing differences in each unit. More particularly, a first set of control signals is provided to components within an optical transponder module having a protective cover in place, and the optical transponder is operated 702. The operation of the optical transponder is monitored 704. Monitoring may include, but is not limited to, sensing the temperature of the optical transponder at one or more locations, sensing the transmit power, and sensing the receive power. Information obtained from monitoring is communicated to a device, or devices, external to the optical modulator 706. A set of parameter values is then generated 708. Generation of the set of parameter values is typically performed by a device, such as but not limited to a computer, external to the optical transponder. Subsequently, the parameter values are stored in a memory disposed with the optical transponder module 710. In this way, unit to unit performance variations can be reduced, by compensating, i.e., changing, the values used in the generation of control signals. For example, the optical output power levels applied to an optical transmitter circuit can be modified from nominal to adjust for variances in performance that typically arise from the accumulation of manufacturing tolerances.

Thus, it can be seen from the above descriptions that methods and apparatus for calibrating, monitoring, and controlling optical transponders have been described.

Some advantages of various embodiments of the present invention include the architectural flexibility to enhance or modify the functionality of an optical transponder module without having to define a new interface connector standard.

Another advantage of some embodiments of the present invention include the ability to engage in automated testing of the optical transponder module while the physically protective and thermally conductive case, or housing, of the optical transponder module is in place.

Various aspects of the present invention may be implemented as circuit-based solutions, including possible implementation on a single integrated circuit. As would be apparent to one skilled in the art, various functions of circuit elements may also be implemented as processing operations in a software program. Such software may be employed in, for example, a digital signal processor, a microcontroller, a special-purpose computer, or a general-purpose computer.

The present invention can be embodied in the form of methods, and apparatus for practicing those methods. Various aspects of the present invention can also be embodied in the form of program code embodied in tangible media, such as punched cards, magnetic tape, floppy disks, hard disk drives, CD-ROMs, flash memory cards, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates in a manner analogous to hardwired logic circuits.

While the present invention has been described in terms of the above-described embodiments, those skilled in the art will recognize that the invention is not limited to the embodiments described. The present invention can be practiced with modification and alteration within the spirit and scope of the appended claims. Thus, the description herein is to be regarded as illustrative rather than restrictive with respect to the present invention.

What is claimed is:

1. An optical transponder, comprising:
   a housing;
   a plurality of electrical or optical components disposed within the housing, the housing being adapted to conduct heat, at least while the optical transponder is in operation, away from the electrical or optical components;
   wherein the plurality of electrical or optical components comprise:
      an electrical-to-optical converter; and
      an optical-to-electrical converter;
   a microcontroller disposed within the housing, and adapted to communicatively interface with a device external to the housing, and to execute a software program;
   an analog-to-digital (A/D) converter disposed within the housing, the A/D converter having a first input terminal coupled to the electrical-to-optical converter and a second input terminal coupled to the optical-to-electrical converter and at least a first output terminal coupled to the microcontroller;
   a sensor disposed within the housing and electrically coupled to the A/D converter; and
   a memory disposed within the housing, coupled to the microcontroller, and adapted to store said software program and calibration information for at least some of the electrical or optical components.

2. The optical transponder of claim 1, further comprising a parallel-to-serial converter coupled to the connector and the microcontroller and adapted to receive a plurality of signal inputs and provide a serial bit stream output; and a serial-to-parallel converter coupled to the connector and the microcontroller and adapted to receive a serial bit stream and to provide a plurality of signal outputs.

3. The optical transponder of claim 2, wherein the
   electrical-to-optical converter is coupled to the parallel-to-serial converter and configured to receive a serial bit stream, and to provide in response, at least one optical signal; and
   the optical-to-electrical converter is coupled to the serial-to-parallel converter and configured to receive at least one optical signal, and to provide in response, an electrical signal.

4. The optical transponder of claim 1, wherein the electrical or optical components comprise a laser adapted to provide an optical output signal; and a photodiode adapted to receive an optical input signal.

5. The optical transponder of claim 1, wherein the sensor comprises a thermistor.

6. The optical transponder of claim 1, wherein the memory comprises a programmable, non-volatile, program code memory.

7. The optical transponder of claim 1, wherein the electrical-to-optical converter is further coupled to a digital-to-analog (D/A) converter; and the optical-to-electrical converter is further coupled to the D/A converter.

8. The optical transponder of claim 1, further comprising a D/A converter coupled between the microcontroller and at least one of the electrical or optical components.

9. The optical transponder of claim 1, wherein the memory and the microcontroller are integrated on a single chip, and the single chip is disposed within a case that provides physical protection for the optical transponder.

10. The optical transponder of claim 1, further comprising a connector disposed through the housing, and adapted to provide electrical communication pathways between the electrical components and at least one device external to the housing, and to further provide electrical communication pathways between the microcontroller and at least one device external to the housing.

11. The optical transponder of claim 1, wherein the housing is configured to allow calibration and testing of the optical transponder while the housing is in place.

12. An optical transponder, comprising:
   means for housing components;
   means for processing electrical or optical signals, housed by the housing means, with the housing means being adapted to conduct heat, at least while the optical transponder is in operation, away from the electrical or optical signal processing means;
   wherein the means for processing electrical or optical signals includes at least:
      an electrical-to-optical converter; and
      an optical-to-electrical converter;
   means housed within the housing means, for communicatively interfacing with a controller external to the optical transponder and for executing a software program;
   means housed within the housing means, for converting analog signals to digital signals, wherein the means for converting analog signals to digital signals includes an analog-to-digital (A/D) converter having a first input means coupled to the electrical-to-optical converter and a second input means coupled to the optical-to-electrical converter and at least a first output means coupled to the means for executing the software program;
   means housed within the housing means, for sensing;
   means for storing the software program and calibration information for the electrical or optical signal processing means; and
   means for providing electrical communication pathways to at least one device external to the optical transponder for the electrical or optical signal processing means, and for the communication and execution means.

13. The optical transponder of claim 12, further comprising
   means housed within the housing means, for receiving a plurality of signal inputs and providing in response, a serial bit stream output; and
   means housed within the housing means, for receiving a serial bit stream and providing in response a plurality of signal outputs.

14. The optical transponder of claim 12, further comprising means for converting digital signals to analog signals, for the communication and execution means, and for the electrical or optical signal processing means.

15. The optical transponder of claim 12, wherein the means for sensing comprises means for sensing temperature at one or more locations within the optical transponder module.

16. The optical transponder of claim 12, wherein the means for sensing comprises:
   means for sensing receive power; and
   means for sensing transmitter power.

* * * * *

UNITED STATES PATENT AND TRADEMARK OFFICE
CERTIFICATE OF CORRECTION

PATENT NO.       : 7,761,010 B2                                          Page 1 of 1
APPLICATION NO.  : 12/177681
DATED            : July 20, 2010
INVENTOR(S)      : Crosby et al.

It is certified that error appears in the above-identified patent and that said Letters Patent is hereby corrected as shown below:

Column 11, line 36, "coupled to the connector and the" should read --coupled to the--
Column 11, line 40, "coupled to the connector and the" should read --coupled to the--

Signed and Sealed this

Sixteenth Day of November, 2010

David J. Kappos
*Director of the United States Patent and Trademark Office*